US006937589B2

(12) United States Patent
Taketsugu

(10) Patent No.: US 6,937,589 B2
(45) Date of Patent: Aug. 30, 2005

(54) MOBILE COMMUNICATION SYSTEM WITH PACKET EFFECTIVELY TRANSMITTED AND CONTROL METHOD FOR THE SAME

(75) Inventor: Masanori Taketsugu, Tokyo (JP)

(73) Assignee: NEC Corporation, Tokyo (JP)

( * ) Notice: Subject to any disclaimer, the term of this patent is extended or adjusted under 35 U.S.C. 154(b) by 856 days.

(21) Appl. No.: 09/820,352

(22) Filed: Mar. 29, 2001

(65) Prior Publication Data

US 2001/0028640 A1 Oct. 11, 2001

(30) Foreign Application Priority Data

Mar. 31, 2000 (JP) ........................................ 2000/096971
Mar. 28, 2001 (JP) ........................................ 2001/093971

(51) Int. Cl.$^7$ ................................................. H04Q 7/24
(52) U.S. Cl. ...................... 370/338; 370/349; 370/467; 455/440
(58) Field of Search ........................... 370/310.1, 310.2, 370/328, 331, 338, 349, 352, 401, 466, 467; 455/432.3, 433, 439, 440, 446, 554, 555, 556, 557, 456.1, 466; 709/224, 227

(56) References Cited

U.S. PATENT DOCUMENTS

| 6,407,988 | B1 | * | 6/2002 | Agraharam et al. | ........ | 370/328 |
| 6,549,522 | B1 | * | 4/2003 | Flynn | ........................ | 370/313 |
| 6,636,498 | B1 | * | 10/2003 | Leung | ........................ | 370/338 |
| 6,684,256 | B1 | * | 1/2004 | Warrier et al. | ............... | 709/238 |
| 6,766,168 | B1 | * | 7/2004 | Lim | ........................ | 455/435.1 |
| 6,771,609 | B1 | * | 8/2004 | Gudat et al. | ................. | 370/254 |
| 6,795,857 | B1 | * | 9/2004 | Leung et al. | ............... | 709/224 |

FOREIGN PATENT DOCUMENTS

| CN | 1138279 A | 12/1996 |
| CN | 1174483 A | 2/1998 |
| JP | 4-373222 | 12/1992 |
| JP | 5-268150 | 10/1993 |
| JP | 8-251229 | 9/1996 |
| JP | 11-234286 | 8/1999 |
| JP | 11-275143 | 10/1999 |
| WO | 99/31853 | 6/1999 |

OTHER PUBLICATIONS

David B. Johnson, Rice University, Charles Perkins, Nokia, "Mobility Support in IPv6", IETF draft–eitf–mobileip–ipv6–13.txt Nov. 17, 2000.
C. Perkins, IBM, "IP Encapsulation within IP", Oct. 1996, (IETF RFC2003).
"RRC Portocol Specification", 3GPP TS25.331, Dec. 2000.
"3GPP2 P.S001 version 1.0 Wireless IP Network Standard, Dec. 10, 1999".
C.E. Perkins, "IETF RFC 2002, IPv4 Mobility Support, Oct. 1996".
"3GPP TR23.923 version 1.0.0 Combined GSM and Mobile IP Mobility Handling in UMTS IP CN, Oct. 6, 1999".
"$3^{rd}$ Generation Partnership Project; Technical Specification Group Services and System Aspects; Combined GSM and MobileIP Mobility Handling in UMTS IP CN", 3G TR 23.923, vol. 9.01.0.0, XP–002203015, Oct. 6, 1999, pp. 1–73.
Charles E. Perkins, "MOBILE IP", IEEE Communications Magazine, vol. 35, No. 5, May 1, 1997, pp. 84–86, 91–99.
Wide Project edition, Murai,J., Yoshimura, S., bit Magazine, "Internet Operations; Principles and Reality", Japan, Kyodachi Publications, May 5, 1999, pp. 250–255.

* cited by examiner

Primary Examiner—Wellington Chin
Assistant Examiner—John Shew
(74) Attorney, Agent, or Firm—Young & Thompson

(57) ABSTRACT

A mobile communication system includes a mobile terminal, a radio access network, and a home agent. The radio access network includes a radio base station which carries out packet communication with the mobile terminal through a radio channel, and a radio channel control station which controls the radio base station. The home agent stores data transmitted from said mobile terminal and associated with a current position of said mobile terminal. The packet communication between the mobile terminal and the radio channel control station is controlled based on radio channel control of packet switching connection. The packet communication from the core network to the radio channel control station is controlled based on mobile IP (mobile Internet Protocol).

12 Claims, 13 Drawing Sheets

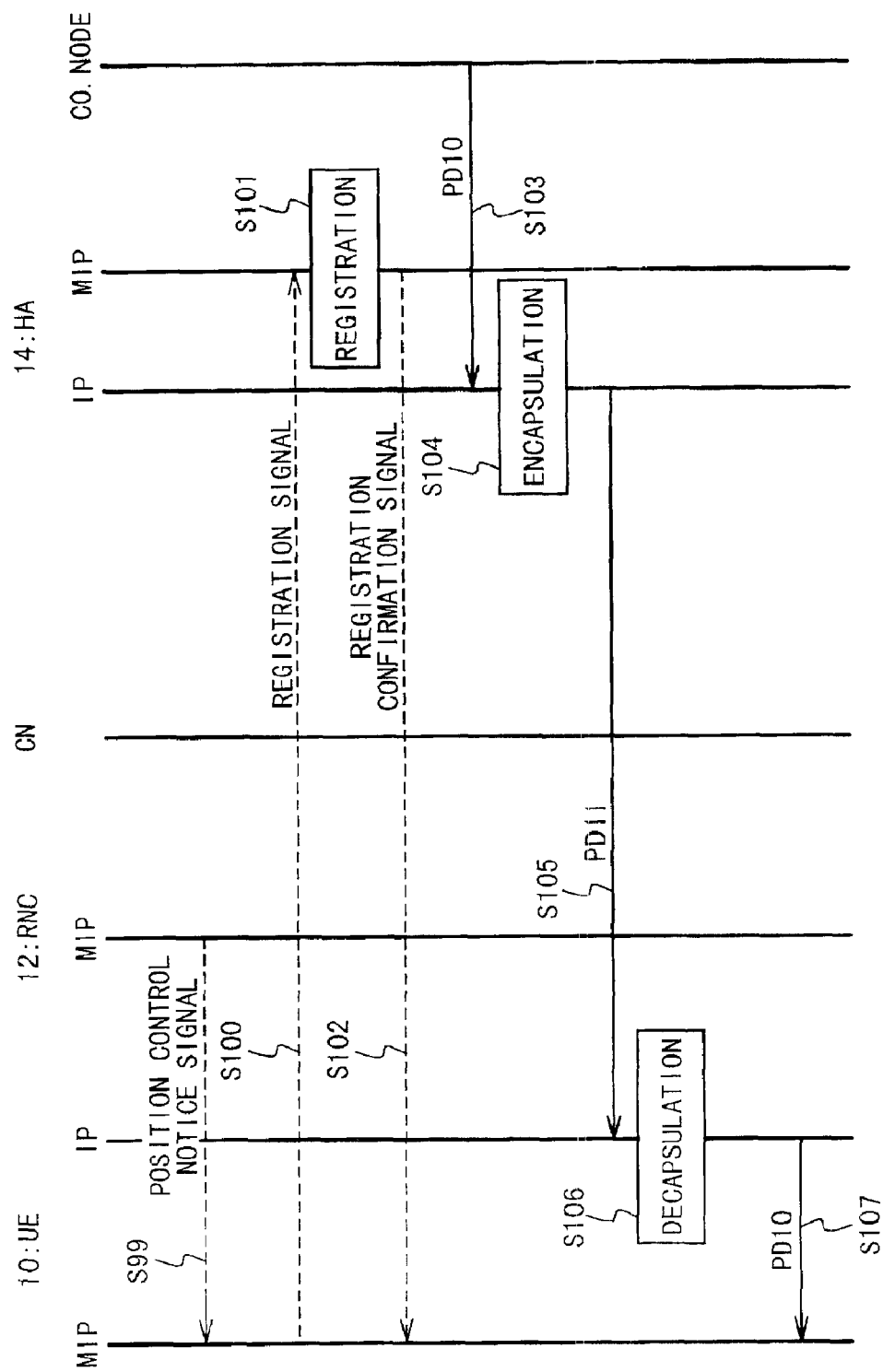

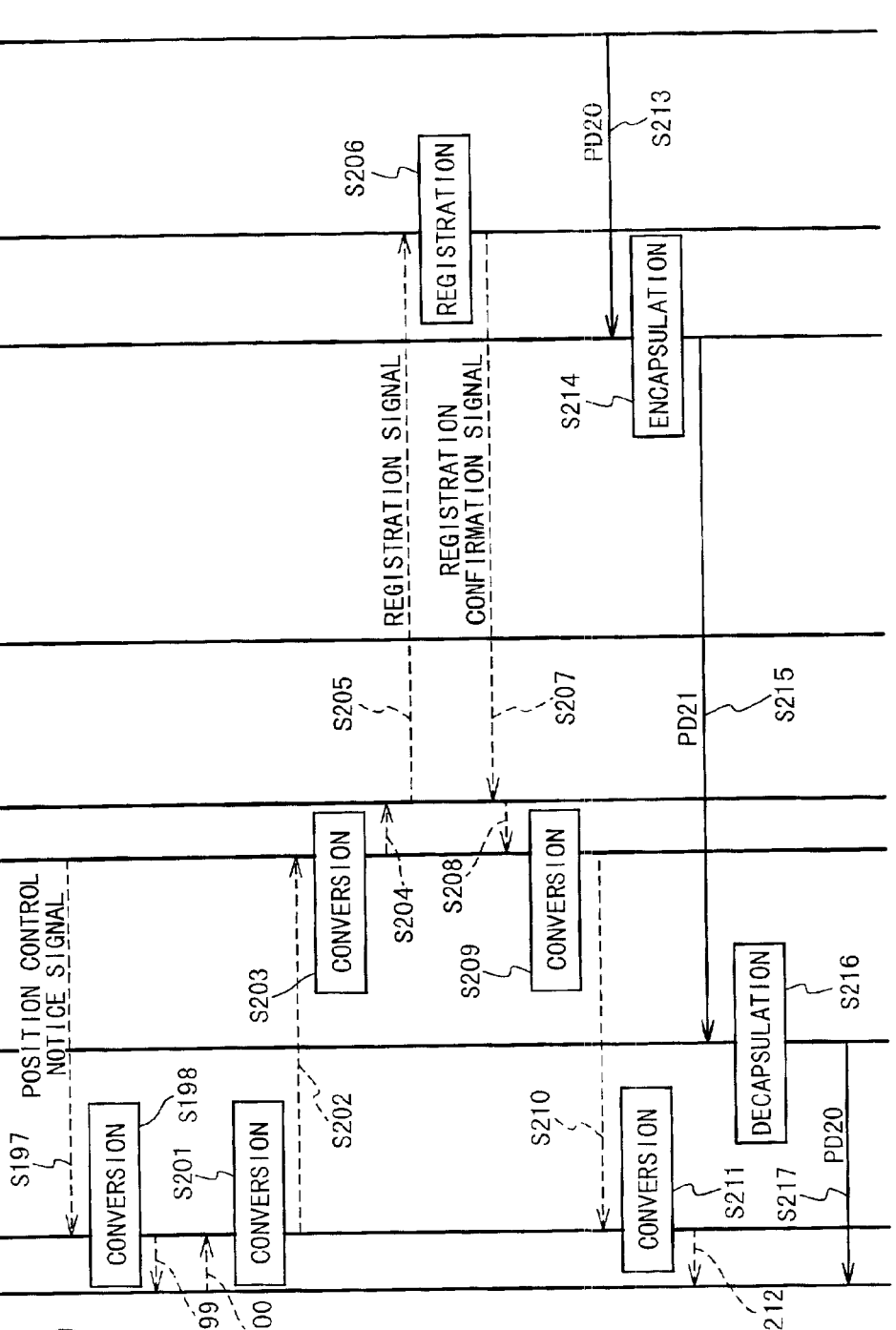

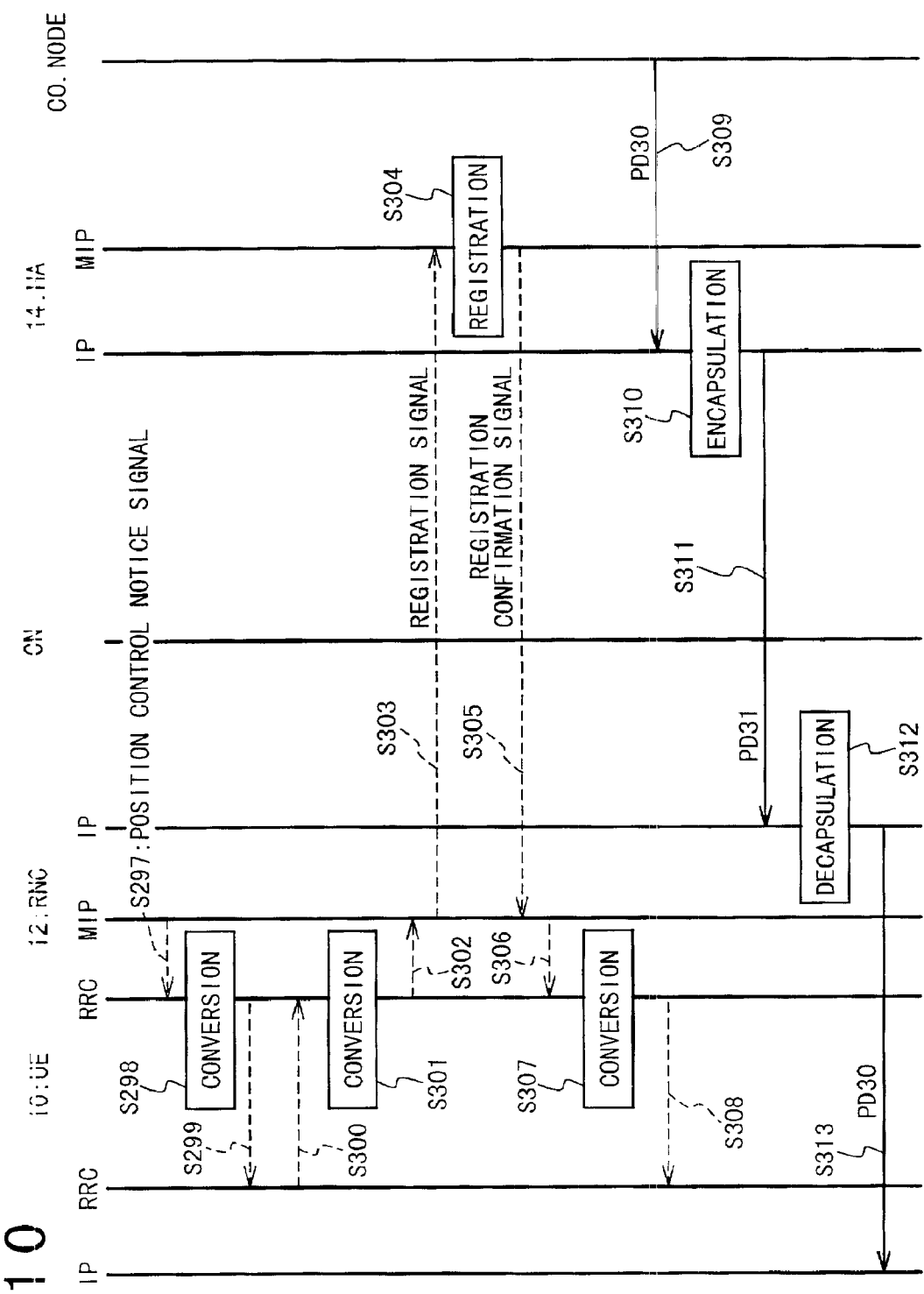

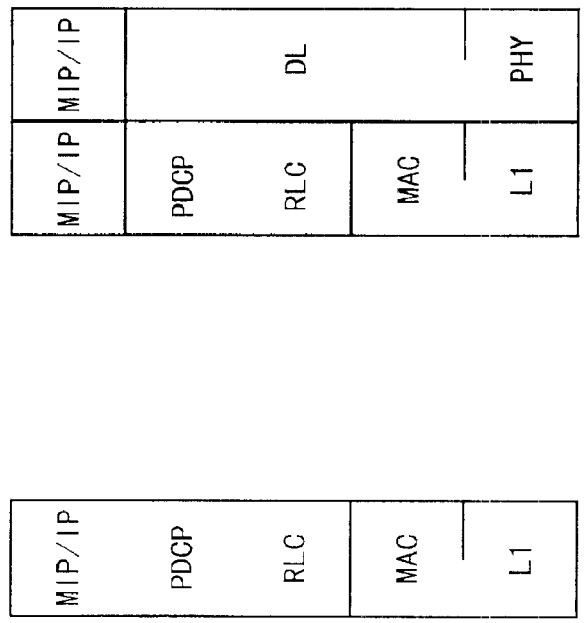

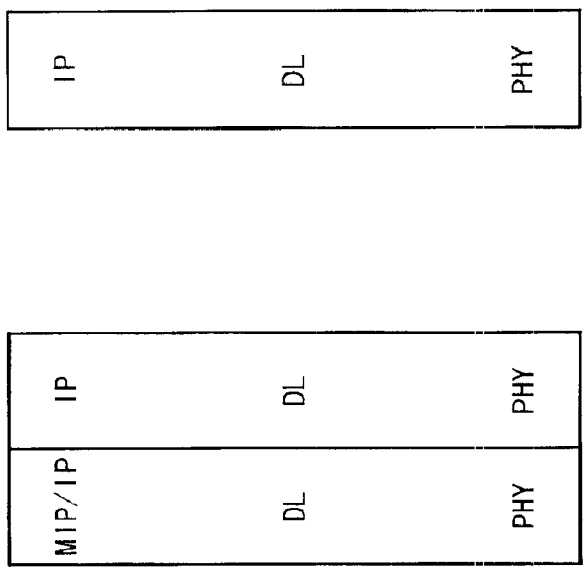
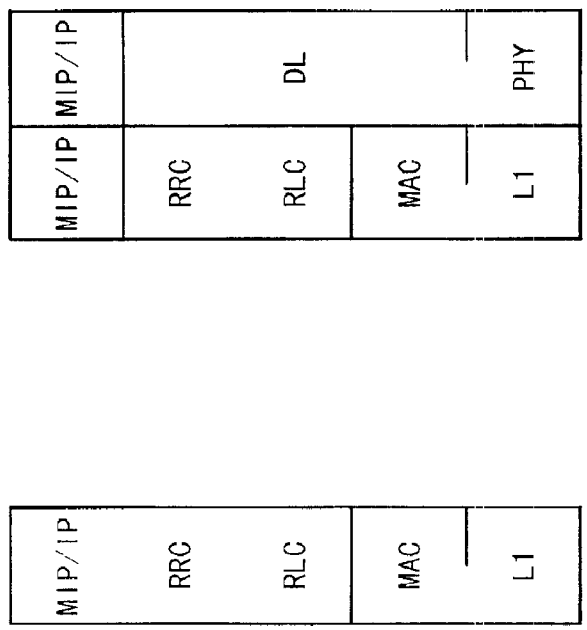

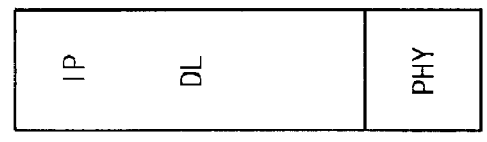
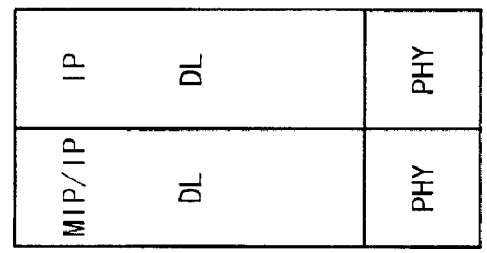
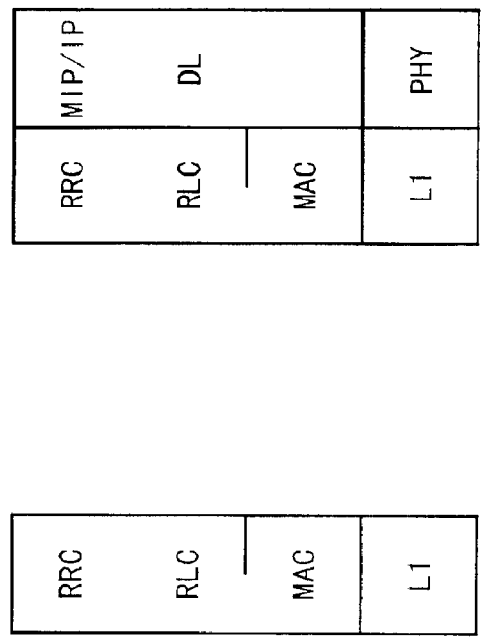

MOBILE COMMUNICATION SYSTEM WITH PACKET EFFECTIVELY TRANSMITTED AND CONTROL METHOD FOR THE SAME

BACKGROUND OF THE INVENTION

1. Field of the Invention

The present invention relates to a mobile communication system which carries out packet communication, and a method of controlling the same.

2. Description of the Related Art

In recent years, a mobile communication system has been studied in which the Internet is accessed from a mobile terminal.

An example of such a mobile communication system is disclosed in a first reference, "3GPP2 P.S001 version 1.0 Wireless IP Network Standard, Dec. 10, 1999". Here, the technique disclosed in the first reference will be simply described with reference to FIG. 1A.

As shown in FIG. 1A, the mobile communication system disclosed in this first reference is composed of a radio access network (RAN) 13, a core network (Core Network; CN) 15a, and the Internet 16. The radio access network RAN 13 includes a radio base station (Node B; NB) 11 with which a mobile terminal 10 communicates through a radio channel, and a radio channel control station (Radio Network Controller; RNC) 12 which controls the radio base station 11. The core network 15a is composed of a home agent (HA) 14a and a foreign agent (FA) 14b to control a call of the mobile terminal 10.

In the mobile communication system, the communication between the core network 15a and the Internet 16 is controlled based on mobile IP (mobile IP) which is discussed in IETF (Internet Engineering Task Force). The mobile IP is a mobile control system studied in IETF. For example, it is disclosed in the second reference, "IETF RFC 2002, C. E. Perkins, IPv4 Mobility Support, October 1996".

To realize the control based on this mobile IP, the home agent (HA) 14a of the core network 15 is installed in a home domain of the mobile terminal 10. The home agent 14a once receives a packet signal transmitted from a communication correspondent node of the mobile terminal 10 to the mobile terminal and transfers the packet signal to the mobile terminal 10 through the foreign agent (FA) 14b. Also, the foreign agent FA 14b detects that mobile terminal 10 is moving into a domain managed by the foreign agent FA 14b, notifies that the mobile terminal 10 is moving into the domain managed by the foreign agent FA 14b, to the home agent 14a.

On the other hand, communication between the foreign agent FA 14b of the core network 15a and the mobile terminal 10 is controlled based on channel switching connection. In the channel switching connection, a fixed band is previously allocated to each mobile terminal to carry out communication.

Also, another example of the mobile communication system is disclosed in the third reference, "3GPP TR23.923 version 1.0.0 Combined GSM and Mobile IP Mobility Handling in UMTS IP CN, Oct. 06, 1999". Here, the technique disclosed in the third reference will be simply described with reference to FIG. 1B.

As shown by FIG. 1B, in case of the second reference, the communication of the Internet 16 is controlled based on the mobile IP. On the other hand, the communication between the core network (CN) 15b and the radio channel control station RNC 12 is controlled based on GTP (GPRS Tunneling Protocol) which is a mobile control system peculiar to the mobile communication system.

However, in the technique disclosed in the above-mentioned first reference, the channel switching connection is carried out. For this reason, a communication band is occupied even when the mobile terminal does not carry out the transmission and reception of data.

Also, in the technique disclosed in the above-mentioned second reference, in the core network, the control system peculiar to the mobile communication system is used. For this reason, the communications protocol is redundant so that the overhead of the communication increases and the network structure is limited.

In conjunction with the above description, a mobile radio communication network is disclosed in Japanese Laid Open Patent Application (JP-A-Heisei 4-373222). In this reference, the mobile radio communication network is composed of a plurality of radio base stations and a plurality of mobile stations, a PSTN network connected to a telephone, and a circuit control station which controls the whole network. A circuit connection unit connected to the radio base station, a PSTN connection unit connected to the PSTN network and a circuit control station are connected by a loop approach circuit.

Also, a mobile communication system is disclosed in Japanese Laid Open Patent Application (JP-A-Heisei 5-268150). In this reference, the mobile communication system is composed of a plurality of mobile stations (MS), a plurality of radio base stations (BS), a radio channel control station (CS) and a switching station. The radio base station is a counter station of the mobile station, and transmits and receives signals using a plurality of connection control channels and a plurality of communication channels, and has a function to relay the signals between the radio channel control station and the mobile station. The radio channel control station has a function to control the setting of the communication channels. The mobile station has a function to always or periodically monitor notice data transmitted on downstream of the connection control channel. The communication channel can be switched between speech communication or continuous data communication in a first use mode and time divisional multiple access communication of burst data in a second use mode. Data of the communication channel in the second use mode is added to the notice data. The communication channel in the second use mode has m time slots for one frame of upstream n time slots for one frame of downstream (m and n are positive integers). A data communication function (6,7) is added to insert in a predetermined time slot of downstream, data indicative of a use state of the other time slots of the same frame.

Also, a radio communication system is disclosed in Japanese Laid Open Patent Application (JP-A-Heisei 8-251229). In the radio communication system of this reference, when both or one of a speech signal for speech communication and a data signal for data communications is inputted, a transmission unit transmits the inputted signal as a radio signal. A receiving unit receives the speech signal and the data signal from the transmission unit to output them. The transmission unit is provided with a speech packet processing section, a data packet processing section, a speech/data control section and a transmission section. The speech packet processing section divides a speech existing portion of the speech signal in units of predetermined units to generate speech packets. The data packet processing section divides a data existing portion of the data signal in units of predetermined units to generate data packets. The speech/data control section determines a transmission order of the speech packets generated by the speech packet processing section and the data packets generated by the data packet processing section. The transmission section transmits the speech packets and the data packets to the reception apparatus in accordance with the transmission order determined by the speech/data control section. The reception apparatus is provided with a reception section, a speech/data identifying section, a speech signal reproducing section and a data signal reproducing section. The reception section receives the speech packets and the data packets from the transmission section. The speech/data identifying section identifies whether the received packet by the reception section is the speech packet or the data packet. The speech signal reproducing section reproduces a speech signal from the speech packets identified by the speech/data identifying section. The data signal reproducing section reproduces the data signal from the data packets identified by the speech/data identifying section.

Also, a radio access method and a radio communication system are disclosed in Japanese Laid Open Patent Application (JP-A-Heisei 11-234286). In the radio access method of this reference, a radio station transmits a packet while a radio frequency is shared by a plurality of radio stations. At that time, the radio station can transmit the packet after it is confirmed that the radio frequency is not used over a priority station access time which can transmit a packet with priority without competition with the other stations and a random time which is selected from predetermined times. When receiving the packet a sending station, a receiving station can transmit a response packet, which notifies reception completion of the packet, to the sending station with priority after the priority station access time. In such a radio access method, in case to send back the response packet, the receiving station (1b) monitors whether the radio frequency is unused over the priority station access time and the random time, (1a) when a transmission wait data packet exists already in the receiving station. The receiving station transmits the transmission wait data packet, (1c) if the radio frequency is unused, and sends the response packet after the priority station access time after transmission completes of the transmission wait data packet. The receiving station (2b) monitors whether the radio frequency is unused over the priority station access time and the maximum time of the predetermined times after receiving the data packet, (2a) when any transmission wait data packet does not exist in the receiving station. The receiving station sends the response packet at once, (2c) if the radio frequency is unused. When the radio frequency is used during the monitor (1b) and (2b), the receiving station transmits the response packet after transmission completion of a data packet from one of the radio stations other than the receiving station and after the priority station access time passes.

Also, a radio data communication subsystem is disclosed in Japanese Laid Open Patent Application (JP-A-Heisei 11-275143). In this reference, the data communication system is composed of a radio interface and a digital network interface. The transmission and reception of data is carried out through the radio interface with a data communication terminal which is connected with a child terminal through a data communication unit. The transmission and reception of data is carried out through the digital network interface with a data communication terminal which is connected with a digital network through a data communication unit. The radio interface of a radio data communication apparatus has a function to establish a radio packet communication channel in accordance with a call connection procedure for the radio packet communication channel and to send and receive data using the radio packet communication channel, and a function to establish a radio communication channel in accordance with a call connection procedure for circuit switching and to send and receive data using the radio communication channel. Also, the digital network interface has a function to establish a digital network packet communication channel in accordance with a call connection procedure for the digital network packet communication channel and to carry out the transmission and reception of data using the digital network packet communication channel and a function to establish a digital network communication channel in accordance with a call connection procedure for circuit switching and to carry out the transmission and reception of data with using the digital network communication channel. When there is a call connection request, the radio interface establishes the radio packet communication channel in accordance with the call connection procedure for the radio packet communication channel. The digital network interface establishes the digital network packet communication channel in accordance with the call connection procedure for the digital network packet communication channel. The digital network interface automatically switches between the data communication using the radio packet communication channel and the data communication using the radio communication channel on the side of the radio interface, and between the data communication using the digital network packet communication channel and the data communication using the digital network communication channel on the side of the digital network interface based on whether an amount of data transmitted and received for a predetermined time interval between the data communication terminal which is connected with the child terminal through the data communication unit and the data communications terminal which is connected with the digital network through the data communication unit exceeds a predetermined threshold, the state of the radio communication channels, and the number of child terminals to be connected.

SUMMARY OF THE INVENTION

Therefore, an object of the present invention is to provide a mobile communication system which realizes efficient transmission of packet data by a core network and the method of controlling the same.

Another object of the present invention is to provide a mobile communication system which can avoid unnecessary occupation of a channel.

Still another object of the present invention is to provide a mobile communication system which mobile IP is introduced to communication from a core network to a radio access network.

Yet still another object of the present invention is to provide a mobile communication system in which the function of a core network is provided on the Internet.

In an aspect of the present invention, a mobile communication system includes a mobile terminal, a radio access network, and a home agent. The radio access network includes a radio base station which carries out packet communication with the mobile terminal through a radio channel, and a radio channel control station which controls the radio base station. The home agent stores data transmitted from the mobile terminal and associated with a current position of the mobile terminal. The packet communication between the mobile terminal and the radio channel control station is controlled based on radio channel control of packet switching connection. The packet communication from the core network to the radio channel control station is controlled based on mobile IP (mobile Internet protocol).

Here, a home agent may receive packet data destined to the mobile terminal once, and transfer the packet data to the mobile terminal based on the stored data associated with the current position of the mobile terminal.

Also, the home agent may be provided in a core network which carries out call control of the mobile terminal, may be provided on the Internet between the radio access network and another radio access network, or may be provided is provided in the radio access network.

Also, the home agent may include a mobile IP module and an IP module. The mobile IP module stores the data associated with the current position of the mobile terminal. Also, the IP module encapsulates the packet data received from a correspondent node, generates encapsulated packet data having the data associated with the current position of the mobile terminal as a destination address, and transmits the encapsulated packet data to the mobile terminal.

In this case, the mobile terminal may include an IP module which decapsulates the encapsulated packet data which has been transmitted from the IP module of the home agent, to extract the packet data. Instead, the radio channel control station may include an IP module which decapsulates the encapsulated packet data which has been transmitted from the IP module of the home agent, to extract the packet data, and transfers the extracted packet data to the mobile terminal.

In the above, the mobile terminal may include a mobile IP module which transmits the data associated with the current position of the mobile terminal to the home agent.

Also, the mobile terminal may include a radio channel control module which transmits the data associated with the current position of the mobile terminal. Also, the radio channel control station may include a radio channel control module which receives the data associated with the current position of the mobile terminal and converts to transmit to the home agent.

Also, the mobile terminal may transmit the data associated with the current position of the mobile terminal in response to a position control notice signal from the radio channel control station.

In another aspect of the present invention, a control method in a mobile communication system, is attained by (a) transmitting user data for position registration of the mobile terminal to a home agent of a core network via a radio channel control station; and (b) registering the user data by the home agent.

Here, the control method may further include (c) establishing a channel between a mobile terminal and a radio channel control station. In this case, the (a) transmitting step includes the step of transmitting the user data to a home agent of the core network via the radio channel control station using the established channel.

Also, the (a) transmitting step may be attained by (d) converting the user data into a control signal by the mobile terminal; by (e) transmitting the control signal to the radio channel control station; by (f) reproducing the user data from the control signal; and by (g) transmitting the reproduced user data to the home agent.

Also, the (a) transmitting step may be attained by (h) transmitting a control signal indicating the user data to the radio channel control station; by (i) converting the control signal into the user data by the radio channel control station; and by (j) transmitting the user data to the home agent.

Also, the (a) transmitting step may be carried out in response to a position control notice signal from the radio channel control station.

Also, communication between the mobile terminal and the radio channel control station is desirably carried out based on radio channel control of packet switching connection, and communication from the core network to the radio channel control station is desirably carried out based on mobile IP (mobile Internet protocol).

BRIEF DESCRIPTION OF THE DRAWINGS

FIG. 8 is a sequence diagram showing the control method of the mobile communication system according to a modification of the first embodiment of the present invention;

FIG. 9 is a sequence diagram showing the control method of the mobile communication system according to a modification of the second embodiment of the present invention;

FIG. 10 is a sequence diagram showing the control method of the mobile communication system according to a modification of the third embodiment of the present invention; and FIGS. 11A to 13D are protocol stack diagrams in the control method of the mobile communication system in the first to third embodiments.

DESCRIPTION OF THE PREFERRED EMBODIMENTS

Hereinafter, a mobile communication system of the present invention will be described with reference to the attached drawings.

Figure 1A:
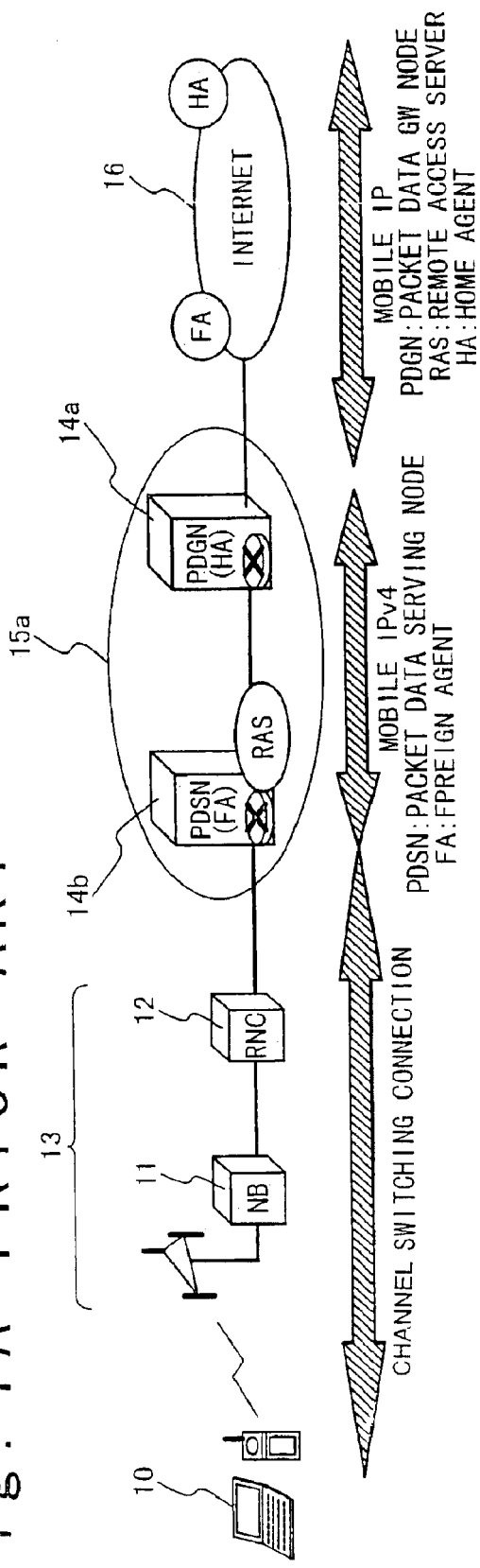
FIGS. 1A and 1B are a diagrams showing conventional mobile communication systems.
Figure 1B:
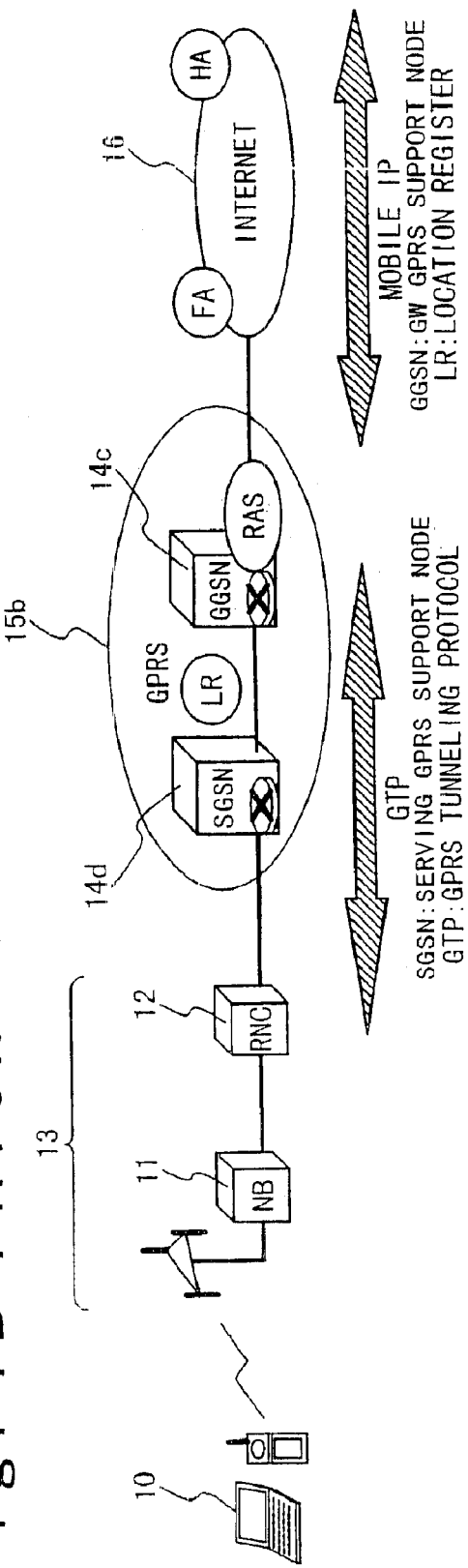
Figure 2:
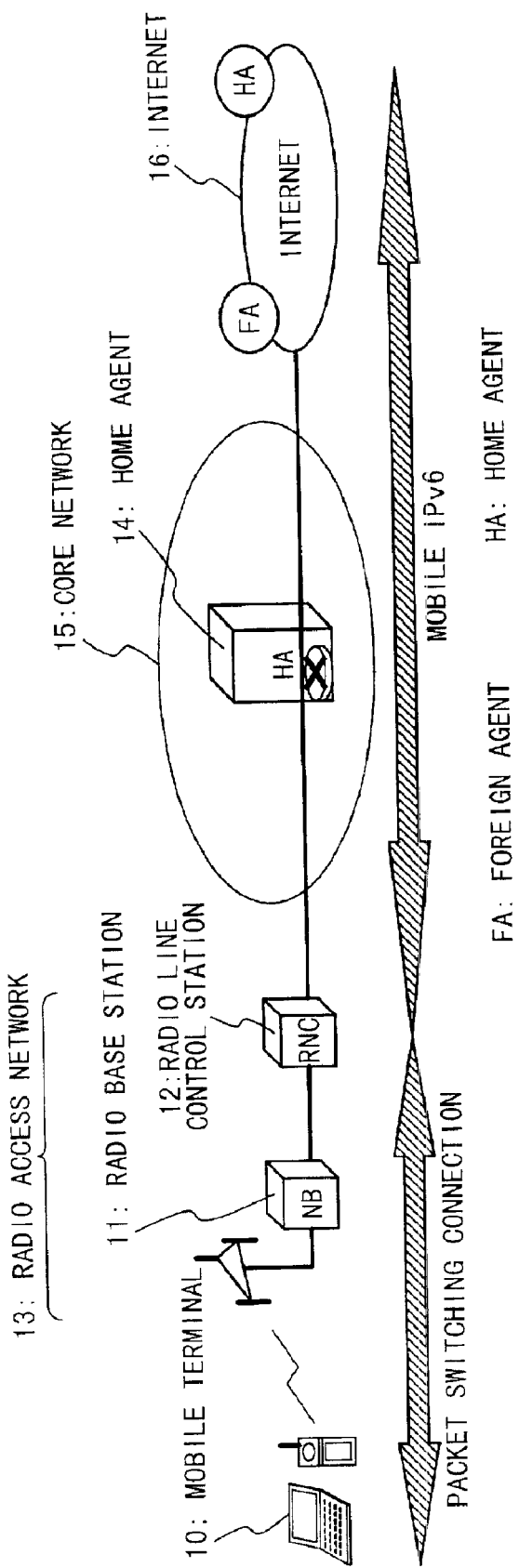
FIG. 2 is a schematic diagram showing the basic structure of a mobile communication system according to the present invention.

First, referring to FIG. 2, the basic structure of the mobile communication system according to the first embodiment of the present invention will be described. As shown in FIG. 2, the mobile communication system in the first embodiment is composed of a mobile terminal UE 10, a radio access network RAN 13, a core network CN 15, and an Internet 16. The radio access network RAN 13 is composed of a radio base station NB 11 with which the mobile terminal 10 communicates through a radio channel, and a radio channel control station RNC 12 which controls the radio base station NB 11. The core network 15 is composed of a home agent HA 14 to carry out call control of the mobile terminal 10.

In the mobile communication system, a packet communication in the radio access network 13 between the mobile terminal UE 10 and the radio channel control station RNC 12 is controlled based on radio channel control of packet switching connection. Thus, the unification multiple effect that a plurality of mobile terminals UE 10 can use a same communication band is achieved. Therefore, it is possible to avoid line from being occupied unnecessarily.

Also, in the mobile communication system, the packet communication from the Internet 16 to the radio channel control station RNC 12 through the core network CN 15 is controlled based on mobile IPv6. The mobile IPv6 is defined in "Mobility Support in IPv6", IETF draft-ietf-mobileip-ipv6-13.txt. With this, the efficient transmission of the packet data through the core network can be realized.

To realize the control based on the mobile IP, a home agent HA 14 of the core network CN 15 stores a current position of the mobile terminal 10, receives the packet data destined to the mobile terminal 10 once, and transfers the received packet data to the mobile terminal 10 based on the stored current position.

Figure 3:
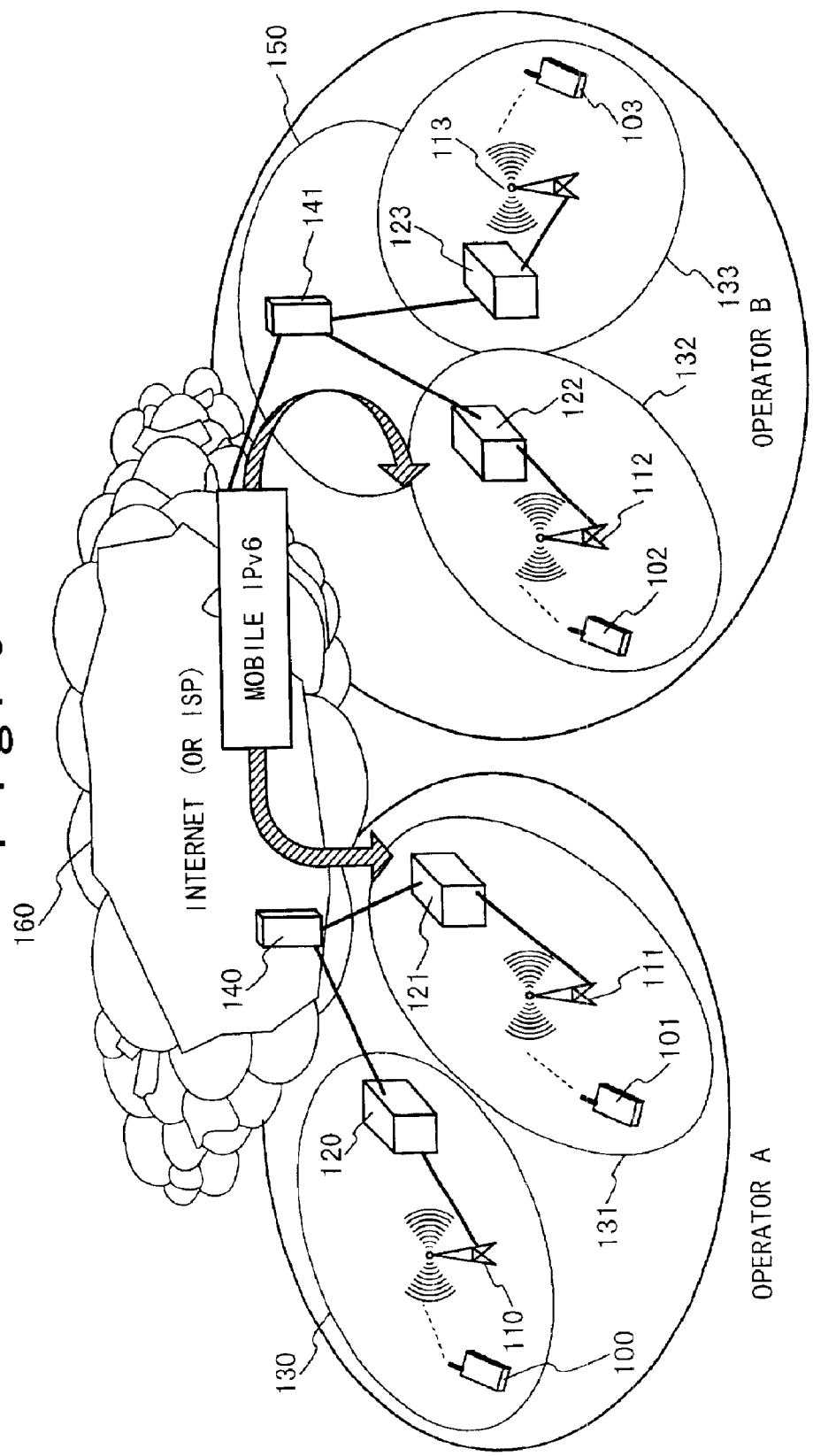
FIG. 3 is a schematic diagram of the whole mobile communication system of the present invention.

Next, referring to FIG. 3, a structural example of a more actual mobile communication system which contains the basic structure shown in FIG. 2 will be described. FIG. 3 shows the structure example of the mobile communication system in which a network of a communication business company "OperatorA" and another network of another communication business company "OperatorB" are connected through the Internet 160.

In FIG. 3, in the network structure built by "OperatorB", two radio access networks 132 and 133 are shown. The radio access networks 132 and 133 are connected with the Internet 160 through the core network 150. Therefore, the network structure built by "OperatorB" corresponds to the basic structure shown in FIG. 2. That is, the mobile terminal UE 10 of FIG. 2 corresponds to the mobile terminals 102 and 103 of FIG. 3, and the radio base station NB 11 of FIG. 2 corresponds to the radio base stations 112 and 113 of FIG. 3. Also, the radio channel control station RNC 12 of FIG. 2 corresponds to the radio channel control stations 122 and 123 of FIG. 3, and the home agent HA 14 of FIG. 2 corresponds to the home agent 141 of FIG. 2. Also, the core network CN 15 of FIG. 2 corresponds to the core network 150 of FIG. 3.

On the other hand, in the network structure built by "OperatorA", two radio access networks 130 and 131 are shown. Also, in the network structure built by "OperatorA", the radio access networks 130 and 131 correspond to the radio access network 13 shown in FIG. 2 but the structure of the independent core network does not exist. That is, the function of the core network is realized by a home agent HA 140 on Internet 160. That is, the home agent 140 carries out call control to the mobile terminals 100 and 101.

In this way, the reason why the independent core network structure can be omitted is in that the mobile IPv6 is introduced into the communication to the radio channel control stations RNC 120 to 123 of the radio access networks 130 to 133 in addition to the core network. That is, packet communication between the radio channel control stations 120 and 121 on the side of "OperatorA" and the radio channel control stations 122 and 123 on the side of "OperatorB" is controlled based on the mobile IPv6. It should be noted that the function of the core network may be realized on the Internet service provider (ISP).

In this way, the more efficient transmission of the packet data can be realized if the Internet 16 has the function of the core network and the network structure in which the independent core network is omitted is adopted. It should be noted that if the function of the core network is realized on the Internet in the network structure of "OperatorB", the structure of the core network 150 can be omitted.

Figure 4:
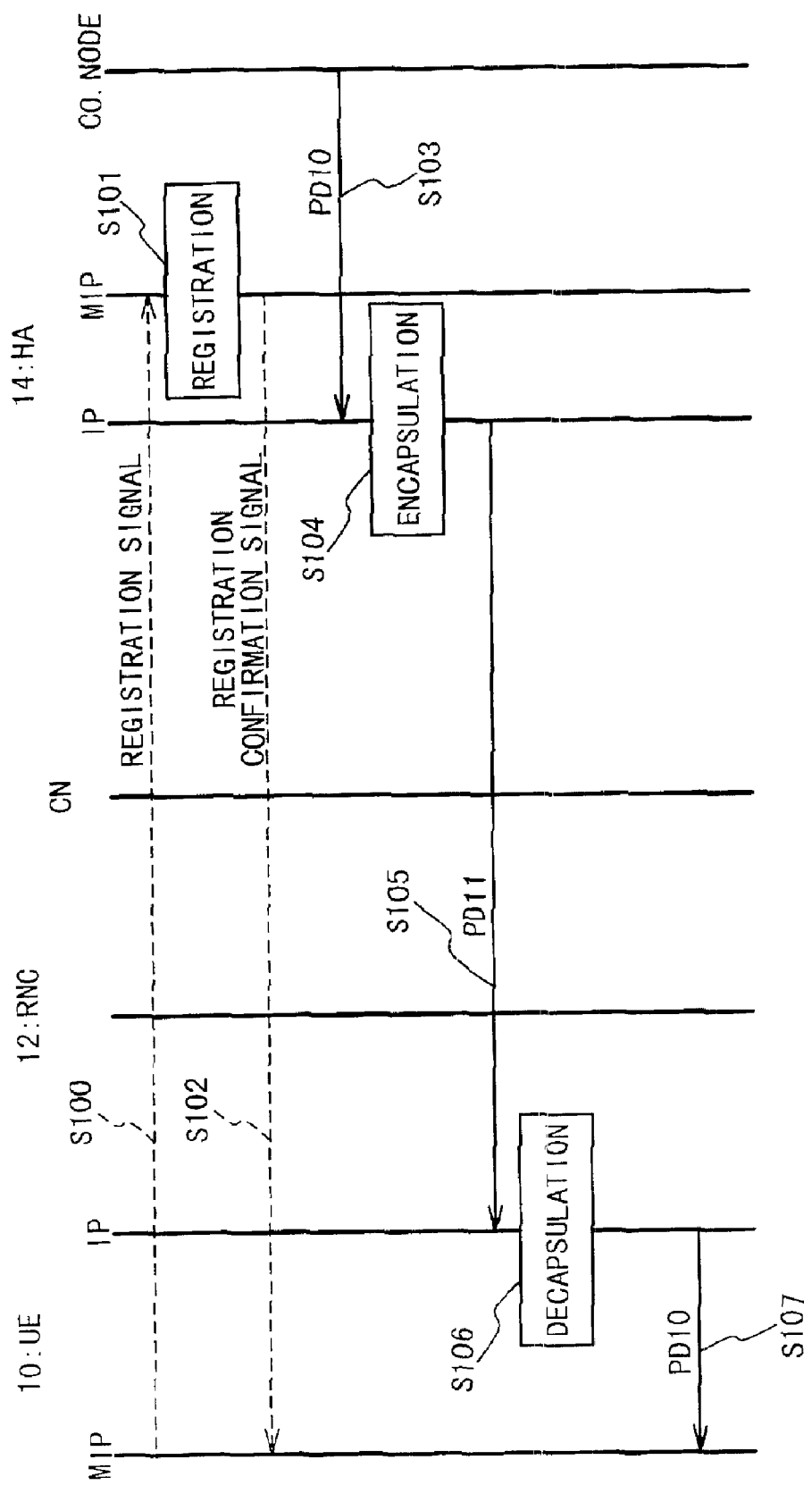
FIG. 4 is a sequence diagram showing a control method of the mobile communication system according to a first embodiment of the present invention.
Figure 5:
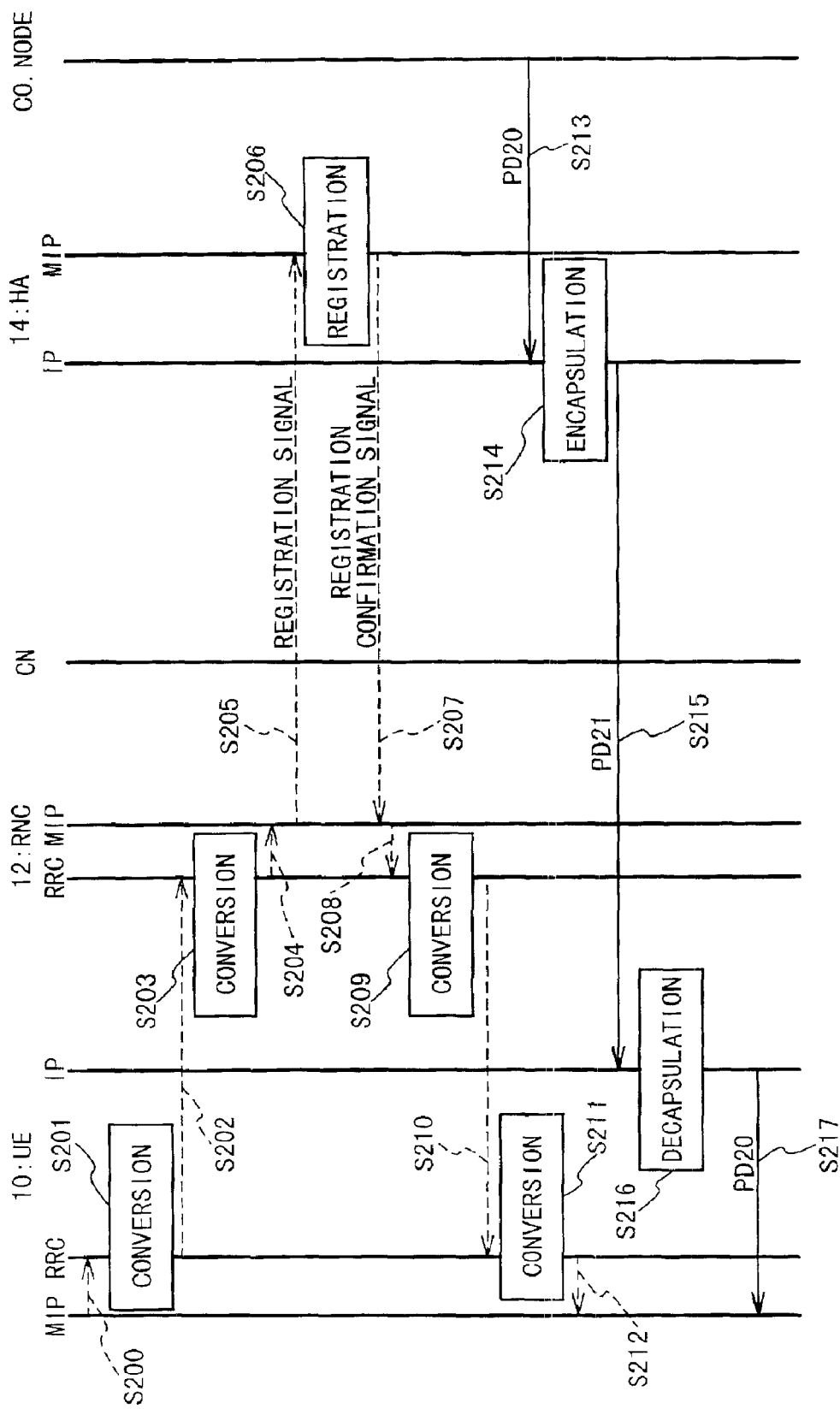
FIG. 5 is a sequence diagram showing the control method of the mobile communication system according to a second embodiment of the present invention.
Figure 6:
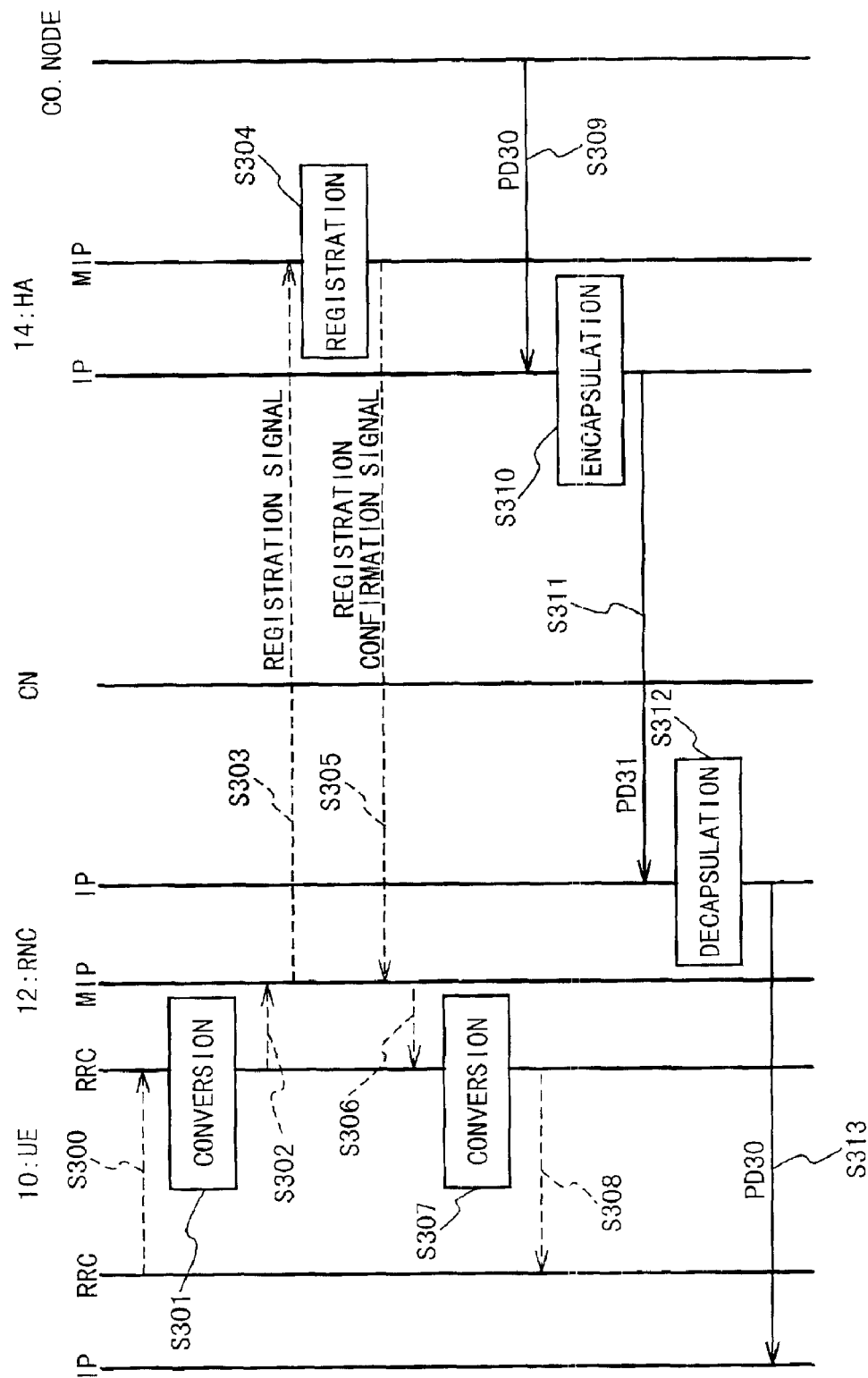
FIG. 6 is a sequence diagram showing the control method of the mobile communication system according to a third embodiment of the present invention.

Next, examples of the operation flow of the mobile communication system shown in FIG. 2 will be described. The protocol stack diagrams corresponding to FIGS. 4, 5 and 6 are shown in the FIGS. 11, 12 and 13. It should be noted that each protocol stack diagram is a protocol stack for the transmission of a "registration signal" and a "registration confirmation signal", and is rather different from the protocol stack when the user data of "PD10, PD20, or PD30" is transmitted. Also, in FIGS. 4, 5 and 6, "encapsulation" is carried out in the home agent HA 12. However, the "encapsulation" may be carried out in the correspondent Node.

First, referring to FIG. 4, an example of the operation flow of the mobile communication system shown in FIG. 2 will be described. In this example, the mobile terminal UE 10 has a function of mobile IP, i.e., has a mobile IP module (MIP). Also, it is assumed that a mobile IP signal is transmitted without conversion. Therefore, a "registration signal" and a "registration confirmation signal" are transmitted as user data signals between the mobile terminal and the home agent (HA).

As shown in FIG. 4, prior to execution of the packet communication, a current position of the mobile terminal UE 10 is registered on the home agent HA 14 of the core network CN 15. In case of the registration, first, the mobile IP module (MIP) (not shown) in the mobile terminal (UE) 10 transmits the registration signal to the home agent HA 14 (Step S100). Data associated with a current position of the mobile terminal 10 being moving is shown in the registration signal.

A mobile IP module (MIP) (not shown) in the home agent HA 14 receives the registration signal and registers the data associated with the current position shown in the registration signal as the transfer destination of the packet data destined to the mobile terminal UE 10 (Step S101).

Next, the mobile IP module (MIP) in the home agent HA 14 transmits the registration confirmation signal to the mobile terminal UE 10 (Step S102). The mobile IP module (MIP) in the mobile terminal UE 10 receives the registration confirmation signal and completes the position registration.

Next, the control will be described when packet data is transmitted from a communication correspondent node (Co. Node) to the mobile terminal UE 10.

First, the communication correspondent node (Co. Node) transmits packet data PD10 destined to the mobile terminal (UE) 10 to the home agent HA 14 (Step S103). The IP module (IP) (not shown) of the home agent HA 14 receives the packet data PD10, and encapsulates the packet data PD10 to generate encapsulated packet data (PD11) (Step S104).

Next, the IP module (IP) of the home agent HA 14 transmits the encapsulated packet data PD11 to the mobile terminal UE 10 (Step S105). The IP module (IP) (not shown) of the mobile terminal UE 10 receives the encapsulated packet data PD11, decapsulates of the encapsulated packet data PD11 to extract the packet data PD10 contained in the encapsulated packet data PD11 (Step S106).

Next, the IP module of the mobile terminal UE 10 transfers the extracted packet data PD10 to the mobile IP module (MIP) in the same UE 10 (Step S107). The mobile IP module (MIP) in the same UE 10 receives the packet data (PD10). Thus, the transmission processing of the packet data completes.

It should be noted that the encapsulation is to produce a packet which has the whole of IP packet transmitted from the correspondent node as a user data section and which has an IP address registered based on the "registration signal" as an address of a header section. Also, the decapsulation is to take out the packet incorporated in the encapsulated packet as the user data. As the method for realizing encapsulation/decapsulation is discussed "IP Encapsulation within IP" (IETF RFC2004). Also, in Ipv6, a function similar to the encapsulation can be realized using an option header.

Next, referring to FIG. 5, another example of the operation flow in the mobile communication system shown in FIG. 2 will be described as the second embodiment. The mobile terminal UE 10 has a function of mobile IP, i.e., has a mobile IP module (MIP). Also, it is assumed that a mobile IP signal is transmitted after conversion into the control signal peculiar to the mobile communication system. Therefore, the "registration signal" and the "registration confirmation signal" are transmitted between the mobile terminal UE 10 and the home agent HA 14 as the mobile communication control signals to the mobile terminal UE 10.

As shown in FIG. 5, before execution of the packet communication, a current position of the mobile terminal UE 10 is registered on the home agent HA 14 of the core network CN 15. In case of the position registration, first, the mobile IP module (MIP) (not shown) in the mobile terminal UE 10 transfers a registration signal as user data to the radio channel control module RRC (not shown) in the same mobile terminal UE 10 (Step S200). The radio channel control module (RRC) receives the registration signal and converts the received registration signal into an RRC registration signal as a control signal peculiar to the mobile communication system (Step S201).

Then, the radio channel control module (RRC) transmits the RRC registration signal to the radio channel control station RNC 12 (Step S202).

The radio channel control module (RRC) (not shown) in the radio channel control station RNC 12 receives the RRC registration signal and converts the RRC registration signal into a registration signal as a control signal of the mobile IP (Step S203). In other words, the radio channel control module (RRC) reproduces the registration signal from the RRC registration signal. Next, the radio channel module (RRC) of the radio channel control station RNC 12 transfers the registration signal to the mobile IP module (MIP) (not shown) of the same radio channel control station RNC 12 (Step S204).

Next, the mobile IP module (MIP) of the same radio channel control station RNC 12 receives the registration signal and transmits the registration signal to the home agent HA 14 (Step S205).

The mobile IP module (MIP) (not shown) of the home agent HA 14 receives the registration signal and registers the data associated with the current position of the mobile terminal UE 10 indicated by the registration signal as the transfer destination of the packet data destined to the mobile terminal UE 10 (Step S206).

Next, the mobile IP module (MIP) of the home agent HA 14 transmits the registration confirmation signal to the radio channel control station RNC 12 (Step S207).

The mobile IP module (MIP) of the radio channel control station RNC 12 receives the registration confirmation signal and transfers the registration confirmation signal to the radio channel control module (RRC) of the same radio channel control station RNC 12 (Step S208).

The radio channel control module (RRC) of the same radio channel control station RNC 12 converts the received registration confirmation signal into an RRC registration confirmation signal as a control signal peculiar to the mobile communication system (Step S209). The radio channel control module (RRC) of the same radio channel control station RNC 12 transmits the RRC registration confirmation signal to the mobile terminal UE 10 (Step S210).

The radio channel control module (RRC) of the mobile terminal UE 10 receives the RRC registration confirmation signal and converts the RRC registration confirmation signal into a registration confirmation signal (Step S211). In other words, the radio channel control module (RRC) reproduces the registration confirmation signal from the RRC registration confirmation signal.

Next, the radio channel control module (RRC) of the mobile terminal UE 10 transfers the registration confirmation signal to the mobile IP module (MIP) in the same mobile terminal UE 10 (Step S212). When the mobile IP module (MIP) of the mobile terminal (UE) 10 receives the registration confirmation signal, the position registration completes.

In this way, in the second embodiment, the RRC registration signal and the RRC registration confirmation signal as the control signals peculiar to the mobile communication system are exchanged through the radio access network 13 between the mobile terminal UE 10 and the radio channel control station RNC 12 in case of position registration. Therefore, in the second embodiment, the mobile terminal UE 10 becomes able to carry out the same processing as the fixed terminal case. Also, the registration signal and registration confirmation signal are transmitted during a radio interval as the control signals peculiar to the mobile communication system. Therefore, the efficient use of the radio channel becomes possible.

Next, the control method in the second embodiment will be described when packet data is transmitted from a communication correspondent node (Co. Node) to the mobile terminal UE 10.

First, the communication correspondent node (Co. Node) transmits packet data PD20 destined to the mobile terminal UE 10 to the home agent HA 14 (Step S213). The IP module (IP) (not shown) of the home agent HA 14 receives the packet data PD20, and encapsulates the received packet data PD20 to generate the encapsulated packet data PD21 (Step S214).

Next, the IP module (IP) of the home agent HA 14 transmits the encapsulated packet data PD21 to the mobile terminal UE 10 (Step S215). The IP module (IP) (not shown) of the mobile terminal UE 10 decapsulates the encapsulated packet data PD21 and extracts the packet data PD20 contained in the encapsulated packet data PD21 (Step S216).

Next, the IP module of the mobile terminal UE 10 transmits the extracted packet data PD20 to the mobile IP module (MIP) of the same mobile terminal UE 10 (Step S217). When the mobile IP module (MIP) receives the packet data PD20, the transmission processing of the packet data completes.

Next, referring to FIG. 6, another example of the operation flow in the mobile communication system shown in FIG. 2 will be described as the third embodiment. The radio channel control station RNC 12 has a function of a mobile IP, i.e., has a mobile IP module (MIP). Also, it is assumed that a mobile IP signal is transmitted after conversion into the control signal peculiar to the mobile communication system. Therefore, the "registration signal" and the "registration confirmation signal" are transmitted between the mobile terminal UE 10 and the home agent HA 14 as the mobile communication control signals to the mobile terminal UE 10.

As shown in FIG. 6, before execution of the packet communication, the position registration of the current position of the moving mobile terminal UE 10 is carried out by the home agent HA 14 of the core network CN 15. In case of the position registration, first, the radio channel control module (RRC) (not shown) of the mobile terminal UE 10 transmits a RRC registration signal as a control signal peculiar to the mobile communication system to the radio channel control station RNC 12 (Step S300).

The radio channel control module (RRC) (not shown) of the radio channel control station RNC 12 receives the RRC registration signal and converts the RRC registration signal into a registration signal which is user data as the control signal of the mobile IP (Step S301).

Next, the radio channel module (RRC) of the radio channel control station RNC 12 transfers the registration signal to the mobile IP module (MIP) (not shown) of the same radio channel control station RNC 12 (Step S302). The mobile IP module (MIP) receives the registration signal and transmits the registration signal to the home agent HA 14 (Step S303).

The mobile IP module (MIP) (not shown) of the home agent HA 14 receives the registration signal and registers the data associated with the current position of the mobile terminal UE 10 indicated by the registration signal as the transfer destination of the packet data destined to the mobile terminal UE 10 (Step S304).

Next, the mobile IP module (MIP) of the home agent HA 14 transmits the registration confirmation signal to the radio channel control station RNC 12 (Step S305).

The mobile IP module (MIP) of the radio channel control station RNC 12 receives the registration confirmation signal and transfers the registration confirmation signal to the radio channel control module (RRC) in the same radio channel control station RNC 12 (Step S306). The radio channel control module (RRC) of the radio channel control station RNC 12 converts the received registration confirmation signal into a RRC registration confirmation signal as a control signal peculiar to the mobile communication system (Step S307). Next, the radio channel control module (RRC) of the radio channel control station RNC 12 transmits the RRC registration confirmation signal to the mobile terminal UE 10 (Step S308).

In the third embodiment, the radio channel control module (RRC) of the mobile terminal UE 10 receives the RRC registration confirmation signal and the position registration completes.

In this way, in the third embodiment, the registration function of the mobile communication system itself is used in case of the position registration. That is, the RRC registration signal is transmitted from the radio channel control module (RRC) of the mobile terminal UE 10. As a result, the mobile IP of the mobile terminal UE 10 needs not to carry out the position register. As a result, the control method in the third embodiment of the present invention can be introduced into the mobile communication system without changing the standard of the radio channel in the radio access network 13.

Next, the control method will be described when packet data is transmitted from a communication correspondent node (Co. Node) to the mobile terminal UE 10.

First, the communication correspondent node (Co. Node) transmits the packet data PD30 destined to the mobile terminal UE 10 to the home agent HA 14 (Step S309). The IP module (IP) (not shown) of the home agent HA 14 receives the packet data PD30, and encapsulates the packet data PD30 to generate the encapsulated packet data PD31 (Step S310).

Next, in the third embodiment, the IP module (IP) of the home agent HA 14 transmits the encapsulated packet data PD31 to the radio time control station RNC 12 (Step S311). The IP module (IP) (not shown) of the radio channel control station RNC 12 decapsulates the received encapsulated packet data PD31 and extracts the packet data PD30 contained in the capsulated packet data PD31 (Step S312).

Next, the IP module of the radio channel control station RNC 12 transmits the extracted packet data PD30 to the mobile terminal UE 10 (Step S313).

The mobile IP module (MIP) of the mobile terminal UE 10 receives the packet data PD30. In this way, the transmission processing of the packet data completes.

Figure 7:
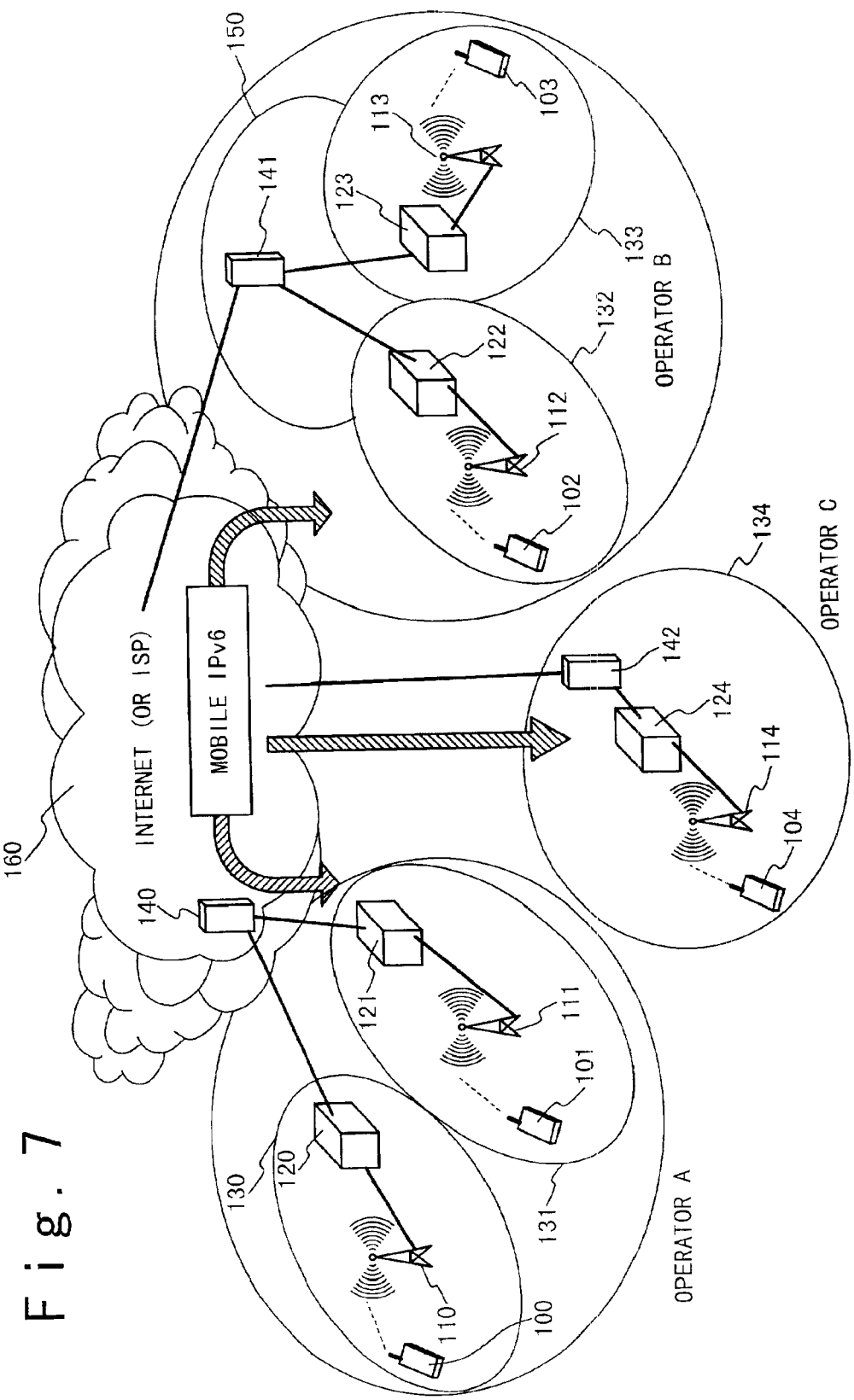
FIG. 7 is a schematic diagram showing the basic structure of another mobile communication system according to the present invention.

Next, referring to FIG. 7, a structural example of another mobile communication system which contains the basic structure shown in FIG. 2 will be described. FIG. 7 shows the structure example of the mobile communication system in which a network of a communication business company "OperatorA" and another network of another communication business company "OperatorB" are connected through the Internet 160. In addition, a network of a communication business company "OperatorC" is connected to the Internet 160.

In FIG. 7, in the network structure built by "OperatorC", the mobile terminal UE 10 of FIG. 2 corresponds to the mobile terminal 104 of FIG. 7, and the radio base station NB 11 of FIG. 2 corresponds to the radio base station 114 of FIG. 7. Also, the radio channel control station RNC 12 of FIG. 2 corresponds to the radio channel control station 124 of FIG. 7, and the home agent HA 14 of FIG. 2 corresponds to the home agent HA 142. Also, the core network CN 15 of FIG. 2 corresponds to a wireless service provider site (not shown) on the Internet.

Next, modifications of the first to third embodiments of the mobile communication system will be described below with reference to FIGS. 8 to 10.

First, in the modification of the first embodiment of the mobile communication system, a step S99 is added to the control flow of FIG. 4 before the step S100. That is, in the step S99, the radio channel control station RNC 12 transmits a position control notice signal to the mobile terminal UE 10 through the radio base station NB 11 under management of the radio channel control station RNC 12 (Step S99). The mobile terminal UE 10 carries out the position registration described above in response to the position control notice signal. Thus, the "position control notice signal" is also transmitted between the mobile terminal UE 10 and the radio channel control station RNC 12.

Next, in the modification of the second embodiment of the mobile communication system, steps S197, S198, and S199 are added to the control flow of FIG. 5 before the step S200. That is, in the step S197, the radio channel control module (RRC) of the radio channel control station RNC 12 transmits an RRC position control notice signal as a control signal peculiar to the mobile communication system to the mobile terminal UE 10 through the radio base station NB 11 under management of the radio channel control station RNC 12 (Step S197). In the step S198, the RRC module of the mobile terminal UE 10 receives the RRC position control notice signal and converts the signal into a position control notice signal as a control signal for the mobile IP (Step S198). In the step S199, the mobile IP position control notice signal is transferred to the mobile IP module (MIP) of the mobile terminal UE 10 (Step S199). The mobile terminal UE 10 carries out the position registration described above in response to the position control notice signal. Thus, the "position control notice signal" is also transmitted between the mobile terminal UE 10 and the radio channel control station RNC 12. The control signals containing the "position control notice signal" are processed by a mobile IP module of the mobile terminal UE 10, after being converted into the mobile IP signals by the RRC module of the mobile terminal UE 10.

Next, in the modification of the third embodiment of the mobile communication system, steps S297, S298, and S299 are added to the control flow of FIG. 6 before the step S300. That is, in the step S297, the mobile IP module (MIP) of the radio channel control station RNC 12 produces and transfers a mobile IP position control notice signal to a radio channel control module (RRC) of the radio channel control station RNC 12 (Step S297). In the step S298, the radio channel control module (RRC) of the radio channel control station RNC 12 receives the mobile IP position control notice signal and converts the signal into an RRC position control notice signal (Step S298). In the step S299, the radio channel control module (RRC) of the radio channel control station RNC 12 transmits the RRC position control notice signal as the control signal peculiar to the mobile communication system to mobile terminal UE 10 through the radio base station NB 11 under management of the radio channel control station RNC 12 (Step S299). The mobile terminal UE 10 carries out the position registration described above in response to the position control notice signal. Thus, the "position control notice signal" is also transmitted between the mobile terminal UE 10 and the radio channel control station RNC 12. The mobile terminal UE 10 does not have any mobile IP module and the RRC module carries out a process for the mobile communication.

In the above description, the position control notice signal as a router advertisement control signal from the radio channel control station RNC 12 to the mobile terminal UE 10 is added. However, if the mobile terminal UE 10 has a timer, it is possible to transmit the registration signal from the mobile terminal UE 10 without dependence on any signal from the network. On the other hand, the mobile terminal UE 10 may determine whether the registration signal can be transmitted, based on a position control notice signal when the position control notice signal is received from the network, as described above.

With the position control notice signal, it is assumed that "agent advertisement" (mobile IPv4) or "router advertisement" (mobile IPv6) is used as the mobile IP signal, and "System Information Block" which is transmitted on BCCH (Broadcast Control CHannel) is used as the RRC signal. With the position registration signal, it is assumed that "Registration Request" (mobile IPv4) or "Binding Update" (mobile IPv6)" is used as the mobile IP signal, and "cell update/URA update" which is transmitted on CCCH (Common Control Channel) is used as the RRC signal.

Here, mobile IPv4 is defined in "IP mobility Support", IETF RFC2002, and RRC is defined in "RRC Protocol Specification", 3GPP TS25.331.

In the above mentioned embodiments, the present invention is described using the examples under specific conditions. However, the present invention may be changed in various points. For example, in the above mentioned embodiments, the example in which the core network is controlled by the mobile IPv6 as the mobile IP is described. However, in the present invention, the mobile IP is not limited to this.

As described above in detail, according to the present invention, a radio channel control is carried out based on the packet switching connection. Therefore, the unification multiple effect that a plurality of the mobile terminals can use an identical communications band is attained. Thus, it is possible to avoid line from being occupied unnecessarily.

Also, in the present invention, the mobile IP which is the control system used in the Internet is introduced into the communication to the radio channel control station of the radio access network in addition to the core network. With this, the efficient transmission of the packet data in the core network can be realized.

Also, the function of the core network which caries out call control can be realized on existing Internet and an Internet service provider (ISP). That is, the Internet or the Internet service provider can combine the core network. As a result, the network structure in which the core network to be connected to the radio access network is omitted can be adopted. With this, the more efficient transmission of the packet data can be realized.

What is claimed is:

1. A mobile communication system comprising:

a mobile terminal;

a radio access network which comprises:
  a radio base station which carries out packet communication with said mobile terminal through a radio channel, and
  a radio channel control station which controls said radio base station; and a home agent which stores data transmitted from said mobile terminal and associated with a current position of said mobile terminal, wherein the packet communication between said mobile terminal and said radio channel control station is controlled based on radio channel control of packet switching connection, and the packet communication from said home agent to said radio channel control station is controlled based on mobile IP (mobile Internet protocol), wherein said home agent receives packet data destined to said mobile terminal and transfers the packet data to said mobile terminal based on the stored data associated with the current position of said mobile terminal, and said home agent includes an IP module that encapsulates the packet data received from a correspondent node, generates encapsulated packet data having the data associated with the current position of said mobile terminal as a destination address, and transmits the encapsulated packet data to said mobile terminal, and wherein said mobile terminal includes an IP module that decapsulates the encapsulated packet data that has been transmitted from said IP module of said home agent, to extract the packet data.

2. The mobile communication system according to claim 1, wherein said home agent is provided in a core network which carries out call control of said mobile terminal.

3. The mobile communication system according to claim 1, wherein said home agent is provided on the Internet between said radio access network and another radio access network.

4. The mobile communication system according to claim 1, wherein said home agent is provided in said radio access network.

5. The mobile communication system according to claim 1, wherein said mobile IP module transmits the data associated with the current position of said mobile terminal to said home agent.

6. The mobile communication system according to claim 1, wherein said mobile terminal comprises:

a radio channel control module which transmits the data associated with the current position of said mobile terminal, and said radio channel control station comprises:

a radio channel control module which receives the data associated with the current position of said mobile terminal and converts to transmit to said home agent.

7. A control method in a mobile communication system, comprising the steps of:

transmitting user data for position registration of a mobile terminal to a home agent of a core network via a radio channel control station; and registering the user data by said home agent;

said home agent receiving packet data destined to said mobile terminal once and transferring the packet data to said mobile terminal based on the data for position registration of said mobile terminal;

said home agent generating encapsulated packet data having the data for position registration of said mobile terminal as a destination address, and transmitting the encapsulated packet data to said mobile terminal; and said mobile terminal decapsulating the encapsulated packet data that has been transmitted from said home agent, to extract the packet data.

8. The control method according to claim 7, further comprises:

establishing a channel between a mobile terminal and a radio channel control station, and wherein said transmitting step comprises the step of transmitting the user data to a home agent of said core network via said radio channel control station using the established channel.

9. The control method according to claim 7, wherein said transmitting step comprises the steps of:

converting the user data into a control signal by said mobile terminal;

transmitting the control signal to said radio channel control station;

reproducing the user data from the control signal; and transmitting the reproduced user data to said home agent.

10. The control method according to claim 7, wherein said transmitting step comprises the steps of:

transmitting a control signal indicating the user data to said radio channel control station;

converting the control signal into the user data by said radio channel control station; and transmitting the user data to said home agent.

11. The control method according to claim 7, wherein said transmitting step is carried out in response to a position control notice signal from said radio channel control station.

12. The control method according to claim 7, wherein communication between said mobile terminal and the radio channel control station is carried out based on radio channel control of packet switching connection, and communication from said core network to said radio channel control station is carried out based on mobile IP (mobile Internet protocol).

* * * * *